(12) United States Patent
Hu et al.

(10) Patent No.: US 12,470,332 B2
(45) Date of Patent: Nov. 11, 2025

(54) DISCONTINUOUS RECEPTION RETRANSMISSION TIMER START METHOD AND APPARATUS, DEVICE, AND MEDIUM

(71) Applicant: GUANGDONG OPPO MOBILE TELECOMMUNICATIONS CORP., LTD., Guangdong (CN)

(72) Inventors: Yi Hu, Guangdong (CN); Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 405 days.

(21) Appl. No.: 18/145,610

(22) Filed: Dec. 22, 2022

(65) Prior Publication Data

US 2023/0208570 A1    Jun. 29, 2023

Related U.S. Application Data

(63) Continuation of application No. PCT/CN2020/121853, filed on Oct. 19, 2020.

(51) Int. Cl.
*H04L 1/1867* (2023.01)
*H04W 76/28* (2018.01)

(52) U.S. Cl.
CPC ............ *H04L 1/188* (2013.01); *H04L 1/1887* (2013.01); *H04W 76/28* (2018.02)

(58) Field of Classification Search
CPC ..... H04L 1/188; H04L 1/1887; H04L 1/1896; H04L 1/1848; H04W 76/28; Y02D 30/70
See application file for complete search history.

(56) References Cited

U.S. PATENT DOCUMENTS

| 9,036,578 B2 | 5/2015 | Cai |
| 2014/0169284 A1 | 6/2014 | Cai et al. |

(Continued)

FOREIGN PATENT DOCUMENTS

| CN | 109245866 A | 1/2019 |
| CN | 110351023 A | 10/2019 |
| CN | 111278171 A | 6/2020 |

OTHER PUBLICATIONS

Panasonic: "Discussion on DRX and BSR in NTN", [Online] Aug. 6, 2020 (Aug. 6, 2020), 3GPP Draft; R2-2006799, 3rd Generation Partnership Project (3GPP), Mobile Competence Centre; 650, Route Des Lucioles; F-06921 Sophia-Antipolis Cedex; France, XP051910845, figures 1-2c, pp. 1-3. 5 pages.

(Continued)

*Primary Examiner* — Yaotang Wang
(74) *Attorney, Agent, or Firm* — PERKINS COIE LLP

(57) ABSTRACT

Provided are methods and apparatuses for starting a discontinuous reception (DRX) retransmission timer, and devices and a medium, and relates to the technical field of communications. The method includes: receiving indication information; and determining whether to start a DRX retransmission timer corresponding to a hybrid automatic repeat request (HARQ) process based on the indication information. For the HARQ process with a HARQ function off, the terminal may flexibly start a DRX retransmission timer corresponding to a HARQ for transmitting data based on the indication information. When the DRX retransmission timer is not started, power can be saved for the terminal.

19 Claims, 13 Drawing Sheets

(56) References Cited

U.S. PATENT DOCUMENTS

| | | | | |
|---|---|---|---|---|
| 2018/0294927 | A1* | 10/2018 | Takeda | H04L 1/1861 |
| 2020/0245395 | A1* | 7/2020 | Zhang | H04W 76/19 |
| 2022/0264616 | A1* | 8/2022 | Shah | H04L 1/1887 |

OTHER PUBLICATIONS

LG Electronics Inc: "Discussion on DRX operation associated with disabling HARQ feedback", [Online] Oct. 4, 2019 (Oct. 4, 2019), 3GPP Draft; R2-1913869 Discussion On Drx Operation Associated With Disabling HARQ Feedback, 3rd Generation Partnership Project (3GPP), Mobile Competence Centre; 650, Route Des Lucioles; F-06921 Sophia-Antipolis Cedex; France, XP051805330, section 2. 2 pages.

OPPO: "Discussion on DRX operation in NTN", [Online] Oct. 3, 2019 (Oct. 3, 2019), 3GPP Draft; R2-1913336, 3rd Generation Partnership Project (3GPP), Mobile Competence Centre; 650, Route Des Lucioles; F-06921 Sophia-Antipolis Cedex; France, XP051791342, section 2. 5 pages.

ZTE Corporation et al: "Further consideration on MAC enhancements", [Online] Oct. 4, 2019 (Oct. 4, 2019), 3GPP Draft; R2-1913083 Further Consideration on MAC Enhancements, 3rd Generation Partnership Project (3GPP), Mobile Competence Centre; 650, Route Des Lucioles; F-06921 Sophia-Antipolis Cedex; France, XP051804829, section 2.2. 8 pages.

Supplementary European Search Report in the European application No. 20957942.4, mailed on Jul. 12, 2023. 9 pages.

International Search Report in the international application No. PCT/CN2020/121853, mailed on Mar. 29, 2021—5 pages.

English translation of the Written Opinion of the International Search Authority in the international application No. PCT/CN2020/121853, mailed on Mar. 29, 2021—6 pages.

Thales, "Solutions for NR to support non-terrestrial networks (NTN)", 3GPP TSG RAN meeting #88e RP-201256 revision from RP-200600 & 193234, e-meeting, Jun. 29-Jul. 3, 2020—10 pages.

* cited by examiner

Indication information is transmitted, the indication information being configured for indicating a terminal whether to start a DRX retransmission timer corresponding to a HARQ process ⟵ 910

FIG. 9

DISCONTINUOUS RECEPTION RETRANSMISSION TIMER START METHOD AND APPARATUS, DEVICE, AND MEDIUM

CROSS-REFERENCE TO RELATED APPLICATION

This U.S. patent application Ser. No. 18/145,610 is a continuation application of International Patent Application No. PCT/CN2020/121853 filed on Oct. 19, 2020, the contents of which are all incorporated herein by reference in their entirety.

TECHNICAL FIELD

The disclosure relates to the technical field of communication, and in particular, to a method and an apparatus for starting a discontinuous reception (DRX) retransmission timer, and a device and a medium.

BACKGROUND

Discontinuous Reception (DRX) is a mechanism that enables a terminal to enter an opportunity for DRX periodically and stop listening to physical downlink control channel (PDCCH) scheduling information (or referred to as a PDCCH sub-frame). In the DRX mechanism, a network device configures a DRX parameter for a terminal, and the DRX parameter is configured to start a DRX timer. The DRX timer is configured to adjust a PDCCH listening duration to meet a service delay requirement when the terminal performs DRX.

In New Ratio (NR), a terminal may start a DRX Hybrid Automatic Repeat request Round-Trip Time (DRX HARQ RTT) Timer first after completing uplink transmission or completing a HARQ process feedback for downlink transmission. The terminal is in an opportunity for DRX and does not listen to a PDCCH during the running of the DRX HARQ RTT Timer. After the timer is timeout, the terminal starts listening to uplink retransmission scheduling or determining whether to start listening to downlink retransmission scheduling according to a feedback condition.

Compared with a cellular network adopted by conventional NR, signal transmission latency between a terminal and a satellite in a Non-Terrestrial Network (NTN) increases significantly. In order to ensure the continuity of data transmission without increasing the number of HARQ processes, a HARQ function may be selected to be enabled or off. A DRX HARQ RTT Timer does not need to be started for a downlink HARQ process with a HARQ feedback function off and an uplink HARQ process with a HARQ retransmission function off. However, it is not clear whether a terminal needs to start a DRX retransmission timer when the terminal listens to a PDCCH and under what condition the DRX retransmission timer is started.

SUMMARY

Embodiments of the disclosure provide methods and apparatuses for starting a DRX retransmission timer, and a device and a medium, by which a terminal can be indicated to flexibly enable or disable the DRX retransmission timer corresponding to a HARQ process. Technical solutions are as follows.

In one aspect, a method for starting a DRX retransmission timer is provided, which may be applied to a terminal and may include the following operations.

Indication information is received.

Whether to start a DRX retransmission timer corresponding to a HARQ process is determined based on the indication information.

In another aspect, a method for starting a DRX retransmission timer is provided, which may be applied to a network device and may include the following operations.

Indication information is transmitted. The indication information is configured for indicating a terminal whether to start a DRX retransmission timer corresponding to a HARQ process.

In another aspect, an apparatus for starting a DRX retransmission timer is provided, which may include a receiving module, and a determination module.

The receiving module is configured to receive indication information.

The determination module is configured to determine whether to start a DRX retransmission timer corresponding to a HARQ process based on the indication information.

In another aspect, an apparatus for starting a DRX retransmission timer is provided, which may include a transmitting module.

The transmitting module is configured to transmit indication information. The indication information is configured for indicating the terminal whether to start a DRX retransmission timer corresponding to a HARQ process.

In another aspect, a terminal is provided. The terminal may include a processor and a memory. The memory stores at least one instruction. The at least one instruction is executed by the processor to implement the method for starting a DRX retransmission timer as described in any of the abovementioned aspects.

In another aspect, a network device is provided. The network device may include a processor and a memory. The memory stores at least one instruction. The at least one instruction is executed by the processor to implement the method for starting a DRX retransmission timer as described in any of the abovementioned aspects.

In another aspect, a computer-readable storage medium is provided. The computer-readable storage medium has an instruction stored thereon. The instruction may be executed by the processor to implement a method for starting a DRX retransmission timer as described in any of the abovementioned aspects.

In another aspect, a computer program product including an instruction is provided. When the product runs on a computer, the computer implements the method for starting a DRX retransmission timer as described in any of the abovementioned aspects.

The technical solutions provided by the embodiments of the disclosure at least include the following beneficial effects.

In the embodiments of the disclosure, for a HARQ process with a HARQ function off, a terminal may determine whether to start a DRX retransmission timer corresponding to the HARQ process based on indication information. Thus, the terminal may flexibly start the DRX retransmission timer corresponding to the HARQ for transmitting data. When the DRX retransmission timer is not started, power can be saved for the terminal.

BRIEF DESCRIPTION OF THE DRAWINGS

In order to describe the technical solutions in the embodiments of the disclosure more clearly, the drawings required to be used in descriptions about the embodiments will be simply introduced below. Apparently, the drawings in the following descriptions are only some embodiments of the disclosure. Those of ordinary skill in the art may further obtain other drawings according to these drawings without creative work.

FIG. 9 is a flowchart of a method for starting a DRX retransmission timer according to another exemplary embodiment of the disclosure.

DETAILED DESCRIPTION

Figure 1:
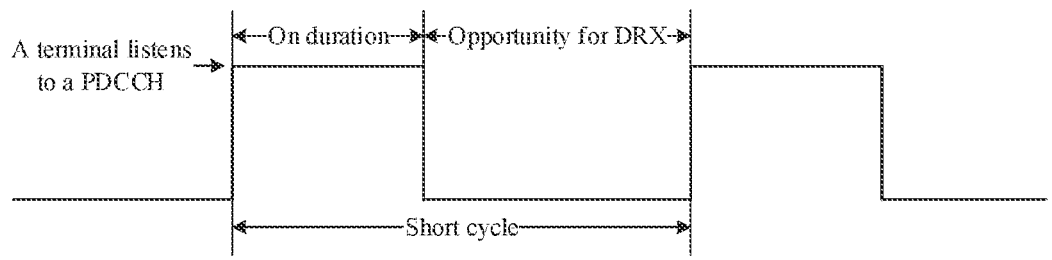
FIG. 1 is a schematic diagram of a DRX cycle according to an exemplary embodiment of the disclosure.

To make the objectives, technical solutions, and advantages of the disclosure clearer, implementation modes of the disclosure will be further described in detail with reference to the accompanying drawings.

Related terms and implementation environments involved in the embodiments of the disclosure will be briefly introduced before introducing in detail a method for starting a DRX retransmission timer according to the embodiments of the disclosure.

First, related terms involved in the disclosure are briefly introduced.

1. NTN System

A Non-Terrestrial Network (NTN) generally provides communication services to ground users by satellite communication. Compared with cellular network communication of a ground new radio (NR) system, satellite communication has many unique advantages. Firstly, satellite communication is not limited by the terrain of users. For example, general terrestrial communication cannot cover areas where a communication device cannot be set up or the communication coverage cannot be made due to the scarcity of population, such as oceans, mountains, and deserts. For satellite communication, since a satellite can cover large ground and can perform orbital motion around the earth, theoretically every corner on the earth can be covered by satellite communication. Secondly, satellite communication contributes a lot to society. Satellite communication can cover remote mountainous areas and poor and undeveloped countries or regions with low cost, so that people in these regions can enjoy advanced voice communication and mobile Internet technology, which is conducive to narrowing the digital divide with developed regions and promoting the development of these regions. Thirdly, the distance of satellite communication is long, and the cost of communication does not increase significantly with increase of communication distance. Finally, satellite communication has high stability and is not limited by natural disasters.

Communication satellites are divided into Low-Earth Orbit (LEO) satellites, Medium-Earth Orbit (MEO) satellites, Geostationary Earth Orbit (GEO) satellites, High Elliptical Orbit (HEO) satellites, etc. based on different orbital heights. The LEO satellites and the GEO satellites are mainly studied at present.

The LEO satellites have a height range of 500 km to 1500 km, and the corresponding orbital cycle is about 1.5 hours to 2 hours. The signal propagation round-trip delay of single hop communication between users is generally less than 20 ms. The satellite can be viewed for 20 minutes at most. The signal propagation distance is short, the link loss is low, and the requirement on the transmission power of a user terminal is not high.

The GEO has an orbital height of 35786 km and a rotation cycle of 24 hours around the earth. The signal propagation round-trip delay of single hop communication between users is generally less than 250 ms.

In order to ensure the coverage of a satellite and improve the system capacity of the whole satellite communication system, the satellite covers the ground by use of a plurality of beams. A satellite can form dozens or even hundreds of beams to cover the ground. The beams of a satellite can cover a ground area with a diameter of tens to hundreds of kilometers.

2. DRX Mechanism

In a DRX mechanism, a terminal is configured with a DRX cycle. Referring to FIG. 1, which shows a schematic diagram of a DRX cycle. The DRX cycle consists of an active status (On Duration) and a dominant status (Opportunity for DRX). Within the On Duration, a terminal listens to and receives PDCCH scheduling information. Within the Opportunity for DRX, the terminal does not listen to data of a downlink channel to reduce power consumption. It can be seen from FIG. 1 that, in time domain, time is divided into continuous DRX cycles. When a scheduling message is received On Duration, the terminal starts a DRX inactivity timer, and listens to PDCCH scheduling information in each PDCCH listening opportunity in this cycle. If the DRX inactivity timer is running, then the terminal still needs to listen to a PDCCH until the DRX Inactivity timer expires even if an originally configured DRX persistence timer has timed out.

Figure 2:
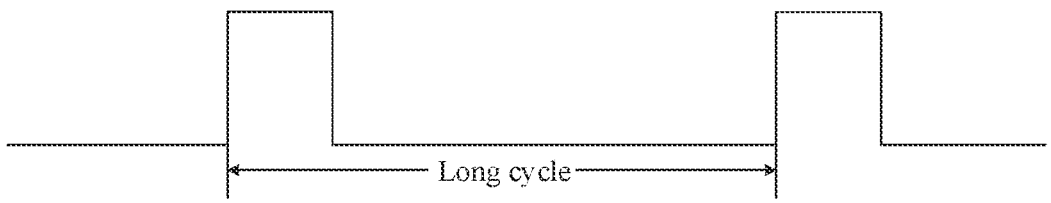
FIG. 2 is a schematic diagram of another DRX cycle according to an exemplary embodiment of the disclosure.

A DRX cycle is equal to the sum of wake-up time and sleep time of User Equipment (UE). The wake-up time is the length of On Duration in the cycle, and the sleep time is the length of Opportunity for DRX in the cycle. In a communication system, according to different service scenarios, a terminal is configured with a short cycle as shown in FIG. 1, or a long cycle as shown in FIG. 2. The long-cycle sleep duration is longer than the short-cycle sleep duration, or the proportion of the long-cycle sleep duration is greater than that of the short-cycle sleep duration. After a DRX inactivity timer expires, if a terminal is configured with a short cycle, then the terminal enters the short cycle, otherwise, the terminal enters the long cycle. For the scenario configured with the short cycle, after the DRX inactivity timer expires, the action that the terminal enters the short cycle is generally that a network, after transmitting a large data packet, transmits a series of small data packets, for example, non-real-time services such as web browsing, and downloads a series of small objects after downloading a home page. The short cycle may be considered as a high activity state.

DRX is configured with a DRX parameter. The DRX parameter is semi-statically configured based on high-level signaling, and is a parameter of each Media Access Control (MAC) entity. The DRX parameter is configured for starting a DRX timer. The DRX timer includes a DRX on duration timer, a DRX inactivity timer, a DRX short cycle timer, a DRX retransmission timer, and a DRX HARQ RTT timer.

3. HARQ Mechanism of NR System

HARQ is a technology that combines Forward Error Correction (FEC) and Automatic Repeat-request (ARQ). A part of all errors, that can be corrected, may be corrected by the FEC technology at a receiving end. Data packets that cannot be corrected are determined by error detection. The data packets that cannot be corrected are discarded, and a transmitting end is requested to re-transmit the same data packets.

There are two tiers of retransmission mechanisms in a NR system: a HARQ mechanism of a Medium Access Control (MAC) layer and an ARQ mechanism of a Radio Link Control (RLC) layer. Retransmission for lost or error data is mainly processed by the HARQ mechanism of the MAC layer, and is supplemented by a retransmission function of the RLC layer. The HARQ mechanism of the MAC layer can provide fast retransmission, and the ARQ mechanism of the RLC layer can provide reliable data transmission.

Data is transmitted in a HARQ process based on a stop-and-wait protocol. In the stop-and-wait protocol, a transmitting end may stop and wait for acknowledgment information after transmitting a transmission block (TB). Thus, the transmitting end may stop and wait for acknowledgment after each transmission, which will result in low user throughput. Therefore, a plurality of parallel HARQ processes are used in a NR system. When acknowledgment information is waited in a HARQ process, a transmitting end can continue transmitting data through another HARQ. These HARQ processes together form an HARQ entity. The HARQ entity combines the stop-and-wait protocol, and allows continuous data transmission. HARQ is classified into uplink HARQ and downlink HARQ. The uplink HARQ is for uplink data transmission, and the downlink HARQ is for downlink data transmission. The two are independent of each other.

Based on the regulations of the current NR protocol, terminal devices have their respective HARQ entities in each serving cell. Each HARQ entity maintains a group of parallel downlink HARQ processes and a group of parallel uplink HARQ processes. In order to distinguish a plurality of HARQ processes, each HARQ process corresponds to a HARQ process number. Exemplarily, a HARQ process number may be a HARQ process Identity Document (ID) for uniquely identifying a HARQ process. A terminal device may determine a HARQ process for transmitting data based on a process number of the HARQ process.

4. Resource Scheduling and Configured Grant

In a 5G (Fifth-Generation) NR standard, two modes for resource scheduling are supported, the first is dynamic resource scheduling, and the other is semi-persistent resource scheduling.

The dynamic resource scheduling refers to that a network device transmits Uplink (UL) grant to a terminal device, and the UL grant contains a time-frequency domain resource occupied by a scheduled uplink data channel. The terminal device may transmit, based on an indication of the UL grant, uplink data on the indicated time-frequency resource.

The semi-persistent resource scheduling refers to that a network device transmits semi-persistent configuration signaling to a terminal device. The semi-persistent configuration signaling contains a time-frequency domain resource occupied by a scheduled uplink data channel. The semi-persistent resource scheduling has two types in the NR standard. Type 1 is that a network device semi-statically configures a periodic uplink data channel for a terminal device at a Radio Resource Control (RRC) layer to transmit data. Type 2 is that a network device semi-statically configures a periodic uplink data channel for a terminal device at an RRC layer to transmit data, but downlink control information from a physical layer is required for activating the configured uplink data channel. The semi-persistent configuration signaling is further configured for indicating to adopt a retransmission mode for uplink data. In a cycle, a terminal device may retransmit same data TB on a configured uplink data channel.

In order to better work for periodic services, the concept of pre-configured resources is introduced in the NR system. A network device may pre-configure resources required for uplink transmitted data of a terminal device in a semi-persistent resource allocation mode through RRC signaling, that is, pre-configuring transmission resources, for example, a downlink Semi-Persistent Scheduling (SPS) resource and an uplink Configured Grant (CG) resource. The configured transmission resource may appear periodically. The terminal device is not required to obtain a scheduling grant before receiving downlink transmission and transmitting uplink transmission each time.

A network device configures a limited number of HARQ processes for each terminal. When a MAC Protocol Data Unit (PDU) corresponding to a first transmission resource is transmitted using a configured first HARQ process, the MAC PDU is stored in a cache area of the first HARQ process. When the network device schedules the first HARQ process to transmit a data packet corresponding to a second transmission resource, the MAC PDU corresponding to the second transmission resource is stored in the cache area of the first HARQ process, and the MAC PDU corresponding to the first transmission resource is cleaned.

Next, implementation environments involved in the embodiments of the disclosure are briefly introduced.

Technical solutions of the embodiments of the disclosure may be applied to various communication systems such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a Frequency Division Duplex (FDD) system, a Time Division Duplex (TDD) system, an Advanced Long Term Evolution (LTE-A) system, an NR system, an LTE-based Access to Unlicensed Spectrum (LTE-U) system, an NR-based Access to Unlicensed Spectrum (NR-U) system, a Universal Mobile Telecommunication System (UMTS), a Worldwide interoperability for Microwave Access (WiMAX) system, a Wireless Local Area Network (WLAN), a Wireless Fidelity (WiFi) system, a next generation communication system, or other communication systems.

Generally speaking, traditional communication systems support a limited number of connections and are easy to implement. However, with the development of the communication technology, mobile communication systems will not only support traditional communication, but also support, for example, Device to Device (D2D) communication, Machine to Machine (M2M) communication, Machine Type Communication (MTC), and Vehicle to Vehicle (V2V) communication, etc. The embodiments of the disclosure can also be applied to these communication systems.

Network architecture and service scenarios described in the embodiments of the disclosure are intended to describe the technical schemes in the embodiments of the disclosure more clearly, but are not intended to limit the technical schemes provided in the embodiments of the disclosure. Those of ordinary skill in the art may know that as the network architecture evolves and a new service scenario emerges, the technical schemes provided in the embodiments of the disclosure are also applicable to a similar technical problem.

Figure 3:
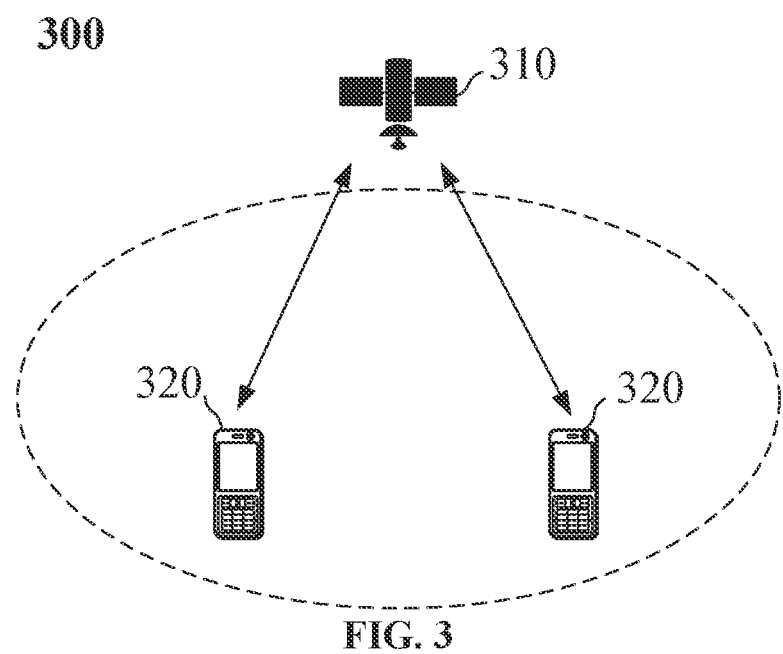
FIG. 3 is a schematic diagram of a communication system according to an exemplary embodiment of the disclosure.

Exemplarily, a communication system 300 applied to the embodiments of the disclosure is as shown in FIG. 3. The communication system 300 may include a network device 310. The network device 310 may be a device in communication with a terminal 320 (or referred to as a communication terminal or UE). The network device 310 may provide communication coverage for a specific geographical area, and may communicate with a terminal located within the coverage. Optionally, the network device 310 may be a satellite in an NTN system.

The communication system 300 may further include at least one terminal 320 located within the coverage of the network device 310. Optionally, Device to Device (D2D) communication may be performed between the terminals 320.

FIG. 3 exemplarily illustrates one network device and two terminal devices. Optionally, the communication system 300 may include a plurality of network devices and the coverage of each network device may include other numbers of terminal devices. No limits are made thereto in the embodiments of the disclosure.

After introducing related terms and implementation environments involved in the embodiments of the disclosure, a method for starting a DRX retransmission timer according to the embodiments of the disclosure will be described in detail in combination with the accompanying drawings.

Figure 4:
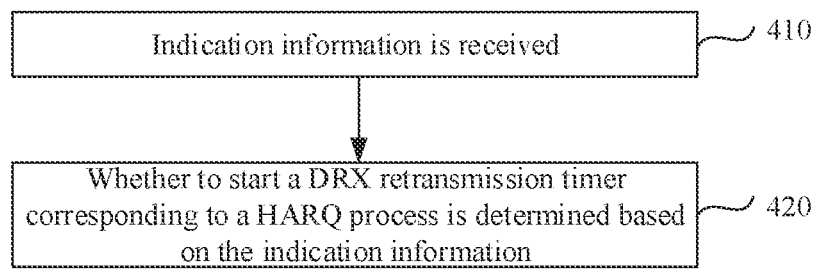
FIG. 4 is a flowchart of a method for starting a DRX retransmission timer according to an exemplary embodiment of the disclosure.

Referring to FIG. 4, FIG. 4 is a flowchart of a method for starting a DRX retransmission timer according to an exemplary embodiment of the disclosure. The method may be implemented by a terminal 320 in a communication system as shown in FIG. 3 above. The method may include at least part of the following contents.

At Step 410, indication information is received.

The indication information is configured for indicating whether to start a DRX retransmission timer corresponding to a HARQ process with a HARQ function off.

In a possible implementation mode, the indication information may be first indication information. The first indication information is configured for indicating the terminal whether to start the DRX retransmission timer corresponding to a downlink HARQ process with a HARQ feedback function off.

In a possible implementation mode, the indication information is second indication information. The second indication information is configured for indicating the terminal whether to start the DRX retransmission timer corresponding to an uplink HARQ process with a HARQ retransmission function off.

It is to be noted that the indication information may be transmitted to the terminal by a network device in a semi-persistent configuration mode, or may be transmitted to the terminal in a dynamic configuration mode. No limits are made thereto in the embodiments of the disclosure.

When semi-persistent configuration is adopted, the indication information may be carried in a system message, RRC dedicated signaling, or a MAC Control Element (MAC CE).

When dynamic configuration is adopted, the indication information may be carried in a PDCCH configured for indicating to schedule initial transmission or retransmission.

In addition, the indication information, when being the first indication information, may work in both a case that downlink transmission is dynamic scheduling and a case that downlink transmission is an SPS transmission; may work only in a case that downlink transmission is dynamic scheduling; or may work only in a case that downlink transmission is SPS transmission. No limits are made thereto in the embodiments of the disclosure.

If the first indication information only works in the case that downlink transmission is SPS transmission, then the first indication information may be carried in a PDCCH for activating SPS.

The indication information, when being the second indication information, may work in both a case that uplink transmission is dynamic scheduling and a case that uplink transmission is CG transmission, or may work only in a case that uplink transmission is dynamic scheduling, or may work only in a case that uplink transmission is CG transmission. No limits are made thereto in the embodiments of the disclosure.

If the second indication information only works in the case that uplink transmission is CG transmission, then the second indication information may be carried in a PDCCH for activating type 2 CG.

At Step 420, whether to start a DRX retransmission timer corresponding to a HARQ process is determined based on the indication information.

Since the indication information may be the first indication information, or may be the second indication information, then, a process of determining whether to start the DRX retransmission timer corresponding to the downlink HARQ process in downlink transmission based on the first indication information is explained first.

There are the following three cases of starting the DRX retransmission timer corresponding to the downlink HARQ process.

The first case is that in a case that a PDCCH configured for indicating to schedule downlink initial transmission is received and the HARQ process used for downlink transmission corresponding to the downlink initial transmission is the HARQ process with the HARQ feedback function off, whether to start the DRX retransmission timer corresponding to the downlink HARQ process is determined based on the first indication information.

The second case is that in a case that a PDCCH configured for indicating to schedule downlink retransmission is received and the HARQ process used for downlink transmission corresponding to the downlink retransmission is the HARQ process with the HARQ feedback function off, whether to start the DRX retransmission timer corresponding to the downlink HARQ process is determined based on the first indication information.

The third case is that in a case that downlink initial transmission (data) is received on a downlink grant resource and the HARQ process used for downlink transmission corresponding to the downlink initial transmission is the HARQ process with the HARQ feedback function off, whether to start the DRX retransmission timer corresponding to the downlink HARQ process is determined based on the first indication information.

Based on the abovementioned three cases, a process that the terminal determines whether to start the DRX retransmission timer corresponding to the downlink HARQ process based on the first indication information may include the following cases.

(1) In a case that the first indication information is configured for indicating not to start the DRX retransmission timer corresponding to the downlink HARQ process with the HARQ feedback function off, the terminal stops the DRX retransmission timer corresponding to each downlink HARQ process with the HARQ feedback function off based on the first indication information.

(2) There are two possible implementation modes in a case that the downlink transmission is dynamic scheduling.

In a possible implementation mode, when the first indication information is configured for indicating to start the DRX retransmission timer corresponding to the downlink HARQ process with the HARQ feedback function off, the terminal, when receiving a PDCCH, starts or restarts the DRX retransmission timer corresponding to the downlink HARQ process based on the first indication information.

In another possible implementation mode, when the first indication information is configured for indicating to start the DRX retransmission timer corresponding to the downlink HARQ process with the HARQ feedback function off, the terminal, based on the first indication information, stops the DRX retransmission timer corresponding to the downlink HARQ process when receiving the PDCCH, and starts the DRX retransmission timer corresponding to the downlink HARQ process after receiving a Physical Downlink Shared Channel (PDSCH) indicated by the PDCCH.

(3) In a case that the downlink transmission is SPS transmission scheduling, when the first indication information is configured for indicating to start the DRX retransmission timer corresponding to the downlink HARQ process with the HARQ feedback function off, the terminal starts the DRX retransmission timer corresponding to the downlink HARQ process after receiving the PDSCH indicated by the PDCCH based on the first indication information.

It is to be noted that the first indication information may be transmitted to the terminal by a network device in a semi-persistent configuration mode, or may be transmitted to the terminal by a network device in a dynamic configuration mode. No limits are made thereto in the embodiments of the disclosure.

Exemplarily, for the abovementioned case (1), the first indication information may be transmitted to the terminal by a network device in a semi-persistent indication mode. For the abovementioned cases (2) and (3), the first indication information may be transmitted to the terminal by a network device in a dynamic indication mode.

Figure 5:
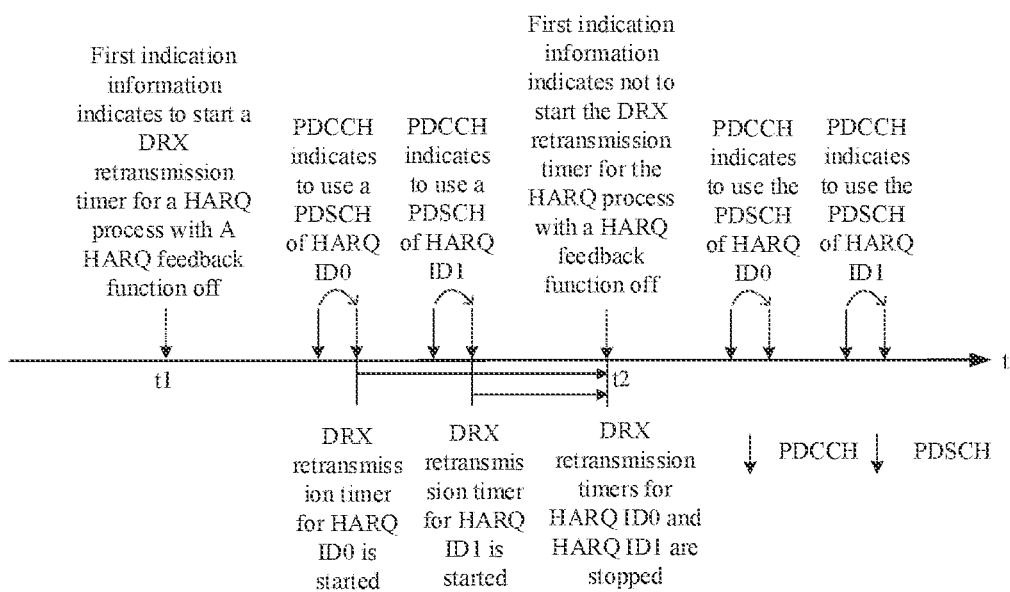
FIG. 5 is a schematic diagram of starting a DRX timer based on first indication information according to an exemplary embodiment of the disclosure.

As an example, referring to FIG. 5, FIG. 5 is a schematic diagram of starting a DRX timer based on first indication information according to an exemplary embodiment of the disclosure. The first indication information is transmitted to the terminal by the network device in a semi-persistent configuration mode. It is assumed that the downlink HARQ processes for the transmission data indicated by the network device through PDCCH scheduling are: HARQ ID0 and HARQ ID1.

In a possible implementation mode, at time t1 as shown in FIG. 5, the network device transmits the first indication information to the terminal. The first indication information is transmitted in a semi-persistent configuration mode, and the terminal is indicated through the first indication information to start the DRX retransmission timer for the HARQ process with the HARQ feedback function off.

Based on the first indication information, the terminal may start the DRX retransmission timer corresponding to the HARQ ID0 when the downlink data is indicated by PDCCH to be received by using a PDSCH of the HARQ ID0. Meanwhile, the terminal may start the DRX retransmission timer corresponding to the HARQ ID0 when the downlink data is indicated by the PDCCH to be received by using a PDSCH of the HARQ ID1.

It is to be noted that before the first indication information for indicating the terminal not to start the DRX retransmission timer for the HARQ process with the HARQ feedback function off is received, or before the cycle of the SPS configuration is ended, the terminal may start the DRX retransmission timer corresponding to the downlink HARQ process each time when downlink data is indicated by the PDCCH to be received by using the PDSCH of the HARQ process.

In another implementation mode, at time t2 as shown in FIG. 5, the network device transmits the first indication information to the terminal. The first indication information is transmitted in a semi-persistent configuration mode, and the first indication information is used to indicate to not start the DRX retransmission timer for the HARQ process with the HARQ feedback function off.

The terminal does not start the DRX retransmission timers corresponding to the HARQ ID0 and the HARQ ID1 when downlink data is indicated by the PDCCH to be received by using the PDSCHs of the HARQ ID0 and the HARQ ID1 based on the first indication information.

When the first indication information is received, the DRX retransmission timers corresponding to the HARQ ID0 and the HARQ ID1 are stopped if the DRX retransmission timers corresponding to the HARQ ID0 and the HARQ ID1 are in a running state.

Similarly, before the first indication information indicating the terminal to start the DRX retransmission timer for the HARQ process with the HARQ feedback function off is received, or before the cycle of the SPS configuration is ended, the terminal may start the DRX retransmission timer corresponding to each downlink HARQ process each time when downlink data is indicated by the PDCCH to be received by using the PDSCH of the HARQ process.

It is to be noted that the abovementioned example only takes HARQ ID0 and HARQ ID1 as examples. In a process of actually receiving downlink data, a network device may configure a plurality of parallel downlink HARQ processes for the terminal. No limits are made thereto in the embodiments of the disclosure.

Figure 6:
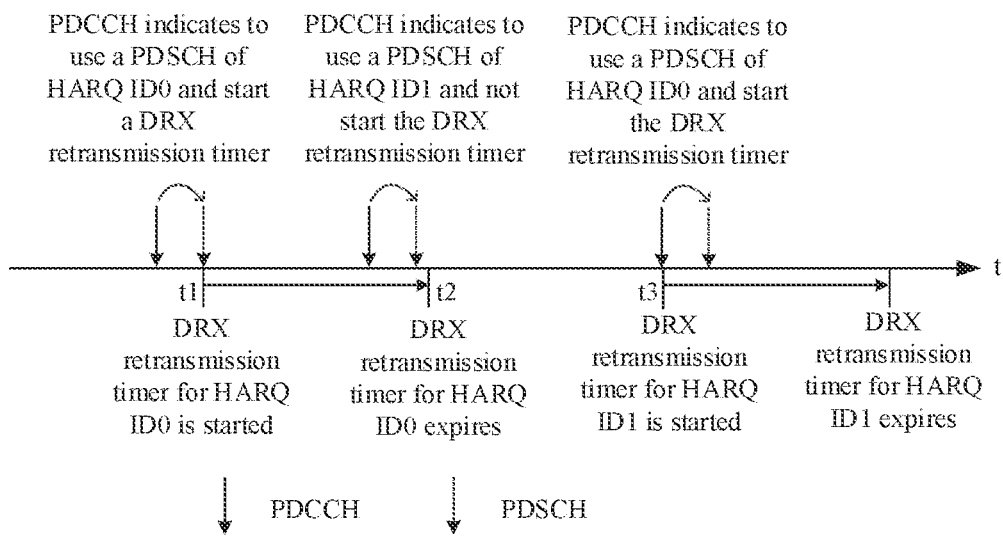
FIG. 6 is another schematic diagram of starting a DRX timer based on first indication information according to an exemplary embodiment of the disclosure.

As another example, referring to FIG. 6, FIG. 6 is another schematic diagram of starting a DRX timer based on first indication information according to an exemplary embodiment of the disclosure. The first indication information is transmitted to the terminal by a network device in a semi-persistent configuration mode. The first indication information may be carried in the PDCCH. It is assumed that the downlink HARQ processes for the transmission data indicated by the network device through the PDCCH scheduling are: HARQ ID0 and HARQ ID1.

At t1 as shown in FIG. 6, the network device indicates, through the PDCCH, the terminal to receive downlink data by using a PDSCH of the HARQ ID0. The PDCCH carries the first indication information. The terminal is indicated through the first indication information to start the DRX retransmission timer for the HARQ process with the HARQ feedback function off.

Based on the first indication information, the terminal may start the DRX retransmission timer corresponding to the HARQ ID0 when downlink data is indicated by the PDCCH to be received by using the PDSCH of the HARQ ID0.

At t2 as shown in FIG. 6, the network device indicates, through the PDCCH, the terminal to receive downlink data by using a PDSCH of the HARQ ID1. The PDCCH carries the first indication information. The terminal is indicated through the first indication information not to start the DRX retransmission timer for the HARQ process with the HARQ feedback function off.

Based on the first indication information, the terminal may not start the DRX retransmission timer corresponding to the HARQ ID1 when downlink data is indicated by the PDCCH to be received by using the PDSCH of the HARQ ID1.

At t3 as shown in FIG. 6, the network device indicates, through the PDCCH, the terminal to receive the downlink data by using the PDSCH of the HARQ ID1. The PDCCH carries the first indication information. The terminal is indicated through the first indication information to start the DRX retransmission timer for the HARQ process with the HARQ feedback function off.

Based on the first indication information, the terminal may start the DRX retransmission timer corresponding to the HARQ ID0 when downlink data is indicated by the PDCCH to be received by the PDSCH of the HARQ ID1.

It is to be noted that a terminal may determine whether to start a DRX retransmission timer corresponding to a HARQ process based on the first indication information carried in a PDCCH when downlink data is indicated by the PDCCH to be received by using a PDSCH of the HARQ process. That is, each PDCCH transmitted by a network device may carry the first indication information. The difference between PDCCHs received at different time is only that the first indication information is for indicating the terminal to start the DRX retransmission timer or is for indicating the terminal not to start the DRX retransmission timer.

Based on the method for starting a DRX retransmission timer based on the first indication information as shown in FIG. 5 and FIG. 6, the running duration of the DRX retransmission timer may be pre-configured by the network device. No limits are made thereto in the embodiments of the disclosure.

Next, a process of determining whether to start the DRX retransmission timer corresponding to the uplink HARQ process in uplink transmission based on the second indication information is explained.

Similarly, there are the following three cases of starting the DRX retransmission timer corresponding to the uplink HARQ process.

The first case is that in a case that a PDCCH configured for indicating to schedule uplink initial transmission is received and the HARQ process used for the uplink transmission corresponding to the uplink initial transmission is the HARQ process with a HARQ retransmission function off, whether to start the DRX retransmission timer corresponding to the uplink HARQ process is determined based on the second indication information.

The second case is that in a case that a PDCCH configured for indicating to schedule uplink retransmission is received and the HARQ process used for the uplink transmission corresponding to the uplink retransmission is the HARQ process with the HARQ retransmission function off, whether to start the DRX retransmission timer corresponding to the uplink HARQ process is determined based on the second indication information.

The third case is that in a case that uplink initial transmission (data) is transmitted on an uplink grant resource and the HARQ process used for the uplink transmission corresponding to the uplink initial transmission is the HARQ process with the HARQ retransmission function off, whether to start the DRX retransmission timer corresponding to the uplink HARQ process is determined based on the second indication information.

Based on the abovementioned three cases, a process that the terminal determines whether to start the DRX retransmission timer corresponding to the uplink HARQ process based on the second indication information includes the following cases.

(1) In a case that the second indication information is configured for indicating not to start the DRX retransmission timer corresponding to the uplink HARQ process with the HARQ retransmission function off, the terminal stops the DRX retransmission timer corresponding to each uplink HARQ process with the HARQ retransmission function off based on the second indication information.

(2) There are two possible implementation modes in a case that the uplink transmission is dynamic scheduling.

In a possible implementation mode, when the second indication information is configured for indicating to start the DRX retransmission timer corresponding to the uplink HARQ process with the HARQ retransmission function off, the terminal, when receiving a PDCCH, may start or restart the DRX retransmission timer corresponding to the uplink HARQ process based on the second indication information.

In another possible implementation mode, when the second indication information is configured for indicating to start the DRX retransmission timer corresponding to the uplink HARQ process with the HARQ retransmission function off, the terminal, based on the second indication information, may stop the DRX retransmission timer corresponding to the uplink HARQ process when receiving the PDCCH, and start the DRX retransmission timer corresponding to the uplink HARQ process after receiving a Physical Uplink Shared Channel (PUSCH) indicated by the PDCCH.

(3) In a case that the uplink transmission is CG transmission scheduling, when the second indication information is configured for indicating to start the DRX retransmission timer corresponding to the uplink HARQ process with the HARQ retransmission function off, the terminal may start the DRX retransmission timer corresponding to the uplink HARQ process based on the second indication information after completing first retransmission on the PUSCH indicated by the PDCCH.

It is to be noted that the second indication information may be transmitted to the terminal by a network device in a semi-persistent configuration mode, or may be transmitted to the terminal by a network device in a dynamic configuration mode. No limits are made thereto in the embodiments of the disclosure.

Exemplarily, for the abovementioned case (1), the second indication information may be transmitted to the terminal by a network device in a semi-persistent indication mode. For the abovementioned cases (2) and (3), the second indication information may be transmitted to the terminal by a network device in a dynamic indication mode.

Figure 7:
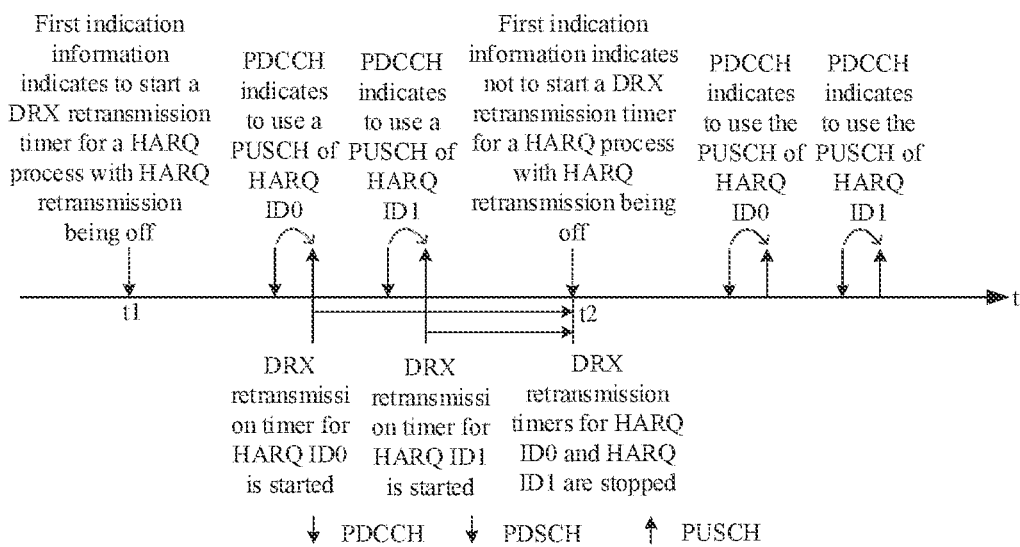
FIG. 7 is a schematic diagram of starting a DRX timer based on second indication information according to an exemplary embodiment of the disclosure.

As an example, referring to FIG. 7, FIG. 7 is a schematic diagram of starting a DRX timer based on the second indication information according to an exemplary embodiment of the disclosure. The second indication information is transmitted to the terminal by a network device in a semi-persistent configuration mode. It is assumed that the uplink HARQ processes for transmission data indicated by the network device through the PDCCH scheduling are: HARQ ID0 and HARQ ID1.

In a possible implementation mode, at t1 as shown in FIG. 7, the network device transmits the second indication information to the terminal. The second indication information is transmitted in a semi-persistent configuration mode. The second indication information is used to indicate to start the DRX retransmission timer for the HARQ process with the HARQ retransmission function off.

Based on the second indication information, the terminal may start the DRX retransmission timer corresponding to the HARQ ID0 after first retransmission is indicated through the PDCCH to be completed by using a PUSCH of the HARQ ID0. Meanwhile, the terminal may start the DRX retransmission timer corresponding to the HARQ ID1 after the first retransmission is indicated through the PDCCH to be completed on a PUSCH of the HARQ ID1.

It is to be noted that before the second indication information for indicating the terminal not to start the DRX retransmission timer for the HARQ process with the HARQ retransmission function off is received, or before the cycle of the SPS configuration is ended, the terminal may start the DRX retransmission timer corresponding to the uplink HARQ process each time when a PUSCH of the HARQ process is indicated through the PDCCH to be completed.

In another implementation mode, at t2 as shown in FIG. 7, the network terminal transmits the second indication information to the terminal. The second indication information is transmitted in a semi-persistent configuration mode. The second indication information is used to indicate not to start the DRX retransmission timer for the HARQ process with the HARQ retransmission function off.

The terminal may not start the DRX retransmission timers corresponding to the HARQ ID0 and the HARQ ID1 when data retransmission is indicated through the PDCCH to be completed by using the PDSCHs of the HARQ ID0 and the HARQ ID1 based on the second indication information.

When the second indication information is received and the DRX retransmission timers corresponding to the HARQ ID0 and the HARQ ID1 are in a running state, the DRX retransmission timers corresponding to the HARQ ID0 and the HARQ ID1 are stopped.

Similarly, before the second indication information for indicating the terminal to start the DRX retransmission timer for the HARQ process with the HARQ retransmission function off is received, or before the cycle of the SPS configuration is ended, the terminal may start the DRX retransmission timer corresponding to each uplink HARQ process each time when data transmission is indicated through the PDCCH to be performed by using a PUSCH of the HARQ process.

It is to be noted that the abovementioned example only takes HARQ ID0 and HARQ ID1 as examples. In a process of actually receiving data, a network device may configure a plurality of parallel uplink HARQ processes for a terminal. No limits are made thereto in the embodiments of the disclosure.

Figure 8:
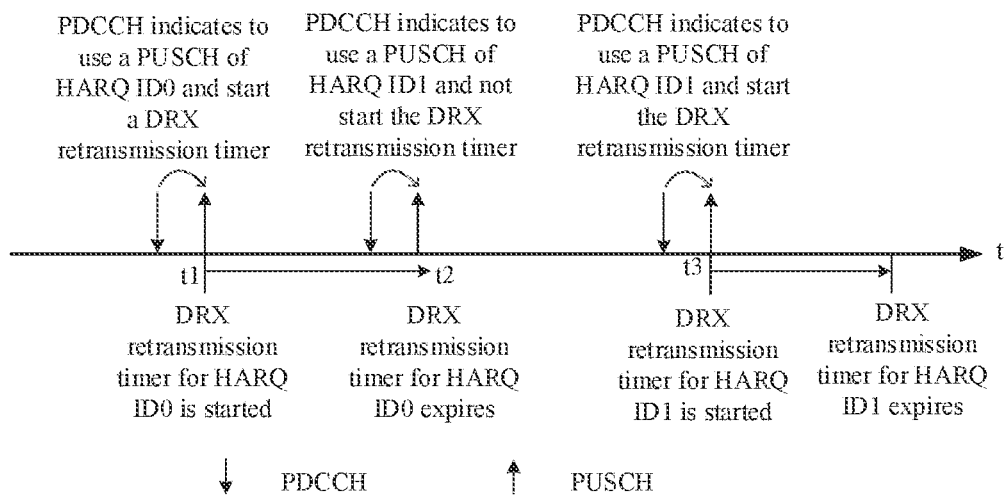
FIG. 8 is a schematic diagram of starting a DRX timer based on second indication information according to an exemplary embodiment of the disclosure.

As another example, referring to FIG. 8, FIG. 8 is another schematic diagram of starting a DRX timer based on second indication information according to an exemplary embodiment of the disclosure. The second indication information is transmitted to the terminal by a network device in a semi-persistent configuration mode. The second indication information is carried in a PDCCH. It is assumed that the uplink HARQ processes for transmission data indicated by the network device through PDCCH scheduling are: HARQ ID0 and HARQ ID1.

At t1 as shown in FIG. 8, the network device indicates, through the PDCCH, the terminal to retransmit uplink data by using a PUSCH of the HARQ ID0. The PDCCH carries the second indication information. The second indication information is used to indicate to start the DRX retransmission timer for the HARQ process with the HARQ retransmission function off.

Based on the second indication information, the terminal may start the DRX retransmission timer corresponding to the HARQ ID0 after first retransmission is indicated through the PDCCH to be completed by using the PUSCH of the HARQ ID0.

At t2 as shown in FIG. 8, the network device indicates, through the PDCCH, the terminal to retransmit the uplink data by using a PUSCH of the HARQ ID1. The PDCCH carries the second indication information. The second indication information is used to indicate not to start the DRX retransmission timer for the HARQ process with the HARQ retransmission function off.

Based on the second indication information, the terminal may not start the DRX retransmission timer corresponding to the HARQ ID1 after first retransmission is indicated through the PDCCH to be completed on the PUSCH of the HARQ ID1.

At t3 as shown in FIG. 8, the network device indicates, through the PDCCH, the terminal to retransmit the uplink data by using the PUSCH of the HARQ ID1. The PDCCH carries the second indication information. The second indication information is used to indicate to start the DRX retransmission timer for the HARQ process with the HARQ retransmission function off.

Based on the second indication information, the terminal may start the DRX retransmission timer corresponding to the HARQ ID1 after first retransmission is indicated through the PDCCH to be completed by using the PUSCH of the HARQ ID1.

It is to be noted that a terminal may determine whether to start a DRX retransmission timer corresponding to a HARQ process based on the second indication information carried in a PDCCH when uplink data is indicated through the PDCCH to be retransmitted by using a PUSCH of the HARQ process. That is, each PDCCH transmitted by a network device may carry the second indication information. The difference between PDCCHs received at different time is only that the second indication information is for indicating the terminal to start the DRX retransmission timer or is for indicating the terminal not to start the DRX retransmission timer.

Based on the starting processes as shown in FIG. 7 and FIG. 8, the running duration of the DRX retransmission timer may be pre-configured by the network device. No limits are made thereto in the embodiments of the disclosure.

In conclusion, in the embodiments of the disclosure, for a HARQ process with a HARQ function off, a terminal may determine whether to start a DRX retransmission timer corresponding to a HARQ process based on the indication information. Thus, the terminal may flexibly start a DRX retransmission timer corresponding to a HARQ for transmitting data. When the DRX retransmission timer is not started, an objective of saving power for the terminal can be achieved.

Referring to FIG. 9, FIG. 9 is a flowchart of a method for starting a DRX retransmission timer according to another exemplary embodiment of the disclosure. The method may be implemented by a network device 310 in a communication system as shown in FIG. 3 above. The method may include at least part of the following contents.

At Step 910, indication information is transmitted. The indication information is configured for indicating a terminal whether to start a DRX retransmission timer corresponding to a HARQ process.

The indication information may be first indication information for downlink transmission. The first indication information is configured for indicating the terminal whether to start a DRX retransmission timer for a downlink HARQ process with a HARQ feedback function off.

The indication information may also be second indication information for uplink transmission. The second indication information is configured for indicating the terminal whether to start a DRX retransmission timer corresponding to an uplink HARQ process with a HARQ retransmission function off.

It is to be noted that the indication information works in both a case that a transmission resource is dynamic scheduling and semi-persistent scheduling at the same time. The semi-persistent scheduling is SPS for indicating to schedule a downlink transmission resource or CG for indicating to schedule an uplink transmission resource; or, the indication information only works in a case that the transmission resource is dynamic scheduling; or, the indication information only works in a case that the transmission resource is SPS.

In addition, the network device may transmit the indication information to the terminal in an SPS configuration mode. Thus, the terminal may determine whether to start the DRX retransmission timer corresponding to the HARQ process according to the pre-configured indication information when receiving downlink data or transmitting uplink data. The indication information may be carried in a system message, RRC dedicated signaling, or a MAC CE.

When the first indication information only works in a case that the downlink transmission is SPS transmission, the first indication information may be carried in the PDCCH for activating SPS. When the second indication information only works in a case that the uplink transmission is CG transmission, the second indication information may be carried in the PDCCH for activating type 2 CG.

The network device may transmit the indication information to the terminal in a dynamic configuration mode. Thus, the terminal may determine whether to start the DRX retransmission timer corresponding to the HARQ process based on the indication information transmitted by the network device in real time when receiving downlink data or transmitting uplink data. The indication information may be carried in the PDCCH indicating to schedule initial transmission or retransmission.

In conclusion, in the embodiments of the disclosure, a network device may effectively control a PDCCH listening action of a terminal by transmitting indication information. The indication information is configured for indicating the terminal whether to start a DRX retransmission timer corresponding to a HARQ process. When a network expects to schedule retransmission, the terminal may be indicated to start the DRX retransmission timer to listen to the PDCCH scheduled by the retransmission. When the network does not expect to schedule retransmission, the terminal may not start the DRX retransmission timer, so as to save power for the terminal.

Figure 10:
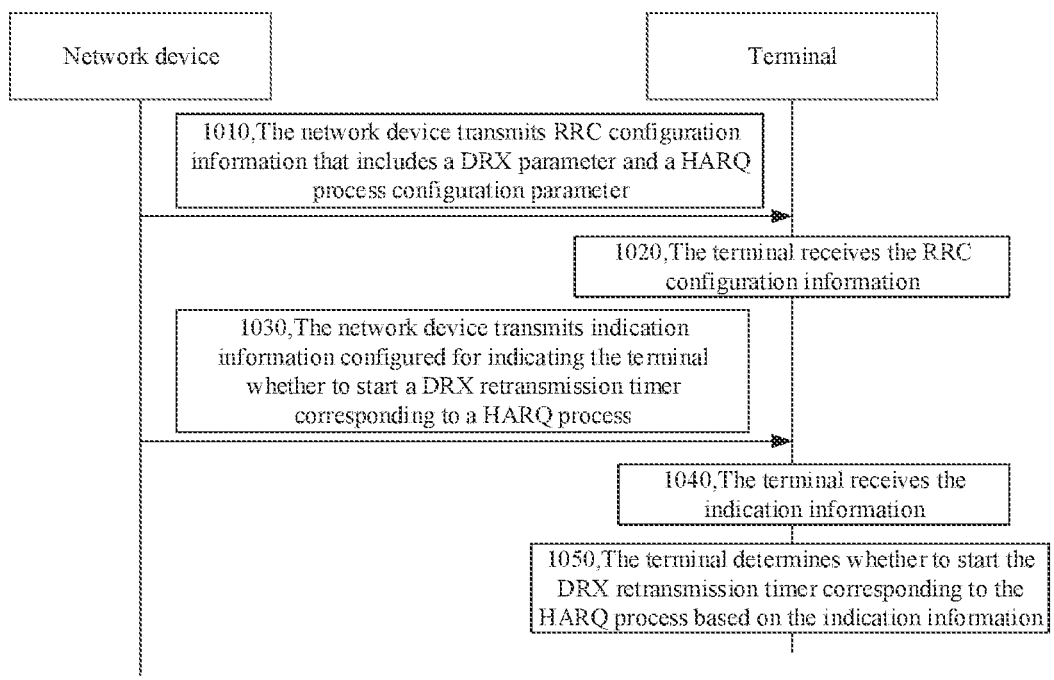
FIG. 10 is a flowchart of a method for starting a DRX retransmission timer according to yet another exemplary embodiment of disclosure.

Next, based on the communication system as shown in FIG. 3, the method for starting a DRX retransmission timer according to the disclosure is explained through an interaction process of the terminal and the network device. Referring to FIG. 10, FIG. 10 is a flowchart of a method for starting a DRX retransmission timer according to yet another exemplary embodiment of disclosure.

At Step 1010, the network device transmits RRC configuration information. The RRC configuration information includes a DRX parameter and a HARQ process configuration parameter.

The DRX parameter is configured for starting a DRX timer. The DRX timer may include a DRX retransmission timer. The HARQ process configuration parameter may include the number of HARQ process(es) and the state information of the HARQ process(es). The state information of the HARQ process is configured for indicating whether a retransmission function or a feedback function of the HARQ process is enabled.

It is to be noted that the DRX timer may further include a DRX on duration timer, a DRX inactivity timer, and a DRX short cycle timer. No limits are made to the configuration parameters of other timers in addition to the DRX retransmission timer in the embodiments of the disclosure.

At Step 1020, the terminal receives the RRC configuration information.

At Step 1030, the network device transmits indication information. The indication information is configured for indicating the terminal whether to start a DRX retransmission timer corresponding to a HARQ process.

In a case that the network device controls an uplink HARQ process and a downlink HARQ process separately through a piece of indication information, the indication contents of the transmitted first indication information and second indication information are the same.

As an example, the content of the indication information may be that the terminal starts a DRX retransmission timer corresponding to a HARQ process. The first indication information is configured for indicating the terminal to start a DRX retransmission timer corresponding to a downlink HARQ process with a HARQ feedback function off. The second indication information is configured for indicating the terminal to start a DRX retransmission timer corresponding to an uplink HARQ process with a HARQ retransmission function off.

In a case that the network device controls the uplink HARQ process and the downlink HARQ process separately through different indication information, the indication contents of the transmitted first and second indication information are different.

As an example, the first indication information is configured for indicating the terminal not to start the DRX retransmission timer corresponding to the downlink HARQ process with the HARQ feedback function off. The second indication information is configured for indicating the terminal to start the DRX retransmission timer corresponding to the uplink HARQ process with the HARQ retransmission function off.

It is to be noted that specific implementation process of Step 1030 may refer to the abovementioned Step 910, which will not be elaborated herein.

At Step 1040, the terminal receives the indication information.

At Step 1050, the terminal determines whether to start the DRX retransmission timer corresponding to the HARQ process based on the indication information.

In conclusion, in the embodiments of this disclosure, a network device may effectively control a PDCCH listening action of a terminal by transmitting indication information. The terminal may determine whether to start a DRX retransmission timer corresponding to a HARQ process based on the indication information. When the network expects to schedule retransmission, the terminal may be indicated to start the DRX retransmission timer to listen to the PDCCH scheduled by the retransmission. When the network does not expect to schedule retransmission, the terminal may not start the DRX retransmission timer, so as to achieve an objective of saving power for the terminal.

Figure 11:
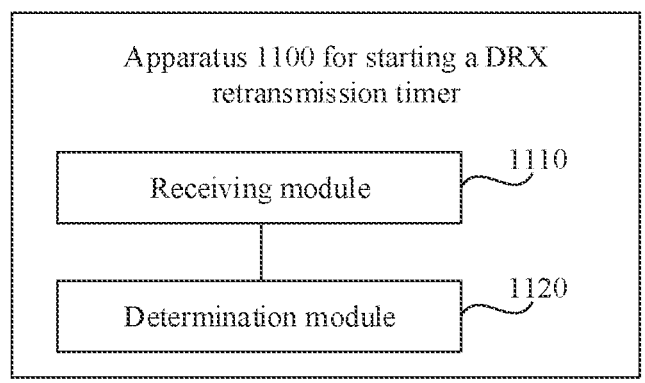
FIG. 11 is a schematic structural diagram of an apparatus for starting a DRX retransmission timer according to an exemplary embodiment of the disclosure.

FIG. 11 is a schematic structural diagram of an apparatus for starting a DRX retransmission timer according to an exemplary embodiment of the disclosure. The apparatus 1100 may be configured in a terminal. The apparatus 1100 includes: a receiving module 1110 and a determination module 1120.

The receiving module 1110 is configured to receive indication information.

The determination module 1120 is configured to determine whether to start a DRX retransmission timer corresponding to a HARQ process based on the indication information.

Optionally, the indication information may be first indication information.

The first indication information is configured for indicating the terminal whether to start the DRX retransmission timer corresponding to a downlink HARQ process with a HARQ feedback function off.

Optionally, the determination module 1120 is further configured to:
  determine whether to start the DRX retransmission timer corresponding to the downlink HARQ process based on the first indication information in a case that a PDCCH configured for indicating to schedule downlink initial transmission is received and the HARQ process used for downlink transmission corresponding to the downlink initial transmission is the HARQ process with the HARQ feedback function off;
  or,
  determine whether to start the DRX retransmission timer corresponding to the downlink HARQ process based on the first indication information in a case that a PDCCH configured for indicating to schedule downlink retransmission is received and the HARQ process used for downlink transmission corresponding to the downlink retransmission is the HARQ process with the HARQ feedback function off.

Optionally, the determination module 1120 is further configured to:
  determine whether to start the DRX retransmission timer corresponding to the downlink HARQ process based on the first indication information in a case that downlink initial transmission (data) is received on a downlink grant resource and the HARQ process used for downlink transmission corresponding to the downlink initial transmission is the HARQ process with the HARQ feedback function off.

Optionally,
  the first indication information may work in both a case that the downlink transmission is dynamic scheduling and a case that the downlink transmission is semi-persistent scheduling (SPS) transmission;
  or,
  the first indication information may only work in a case that the downlink transmission is dynamic scheduling;
  or,
  the first indication information may only work in a case that the downlink transmission is SPS transmission.

Optionally, the determination module 1120 is further configured to:
  stop the DRX retransmission timer corresponding to each downlink HARQ process with the HARQ feedback function off in a case that the first indication information is configured for indicating not to start the DRX retransmission timer corresponding to the downlink HARQ process with the HARQ feedback function off.

Optionally, the determination module 1120 is further configured to:
  start or restart the DRX retransmission timer corresponding to the downlink HARQ process when receiving the PDCCH, in a case that the downlink transmission is dynamic scheduling and that the first indication information is configured for indicating to start the DRX retransmission timer corresponding to the downlink HARQ process with the HARQ feedback function off;
  or,
  stop the DRX retransmission timer corresponding to the downlink HARQ process when receiving the PDCCH, and start the DRX retransmission timer corresponding to the downlink HARQ process after receiving a PDSCH indicated by the PDCCH, in a case that the downlink transmission is dynamic scheduling and that the first indication information is configured for indicating to start the DRX retransmission timer corresponding to the downlink HARQ process with the HARQ feedback function off.

Optionally, the determination module 1120 is further configured to:
  start the DRX retransmission timer corresponding to the downlink HARQ process after receiving a PDSCH indicated by the PDCCH in a case that the downlink transmission is SPS transmission scheduling and that the first indication information is configured for indicating to start the DRX retransmission timer corresponding to the downlink HARQ process with the HARQ feedback function off.

Optionally, the indication information is second indication information.

The second indication information is configured for indicating the terminal whether to start a DRX retransmission timer corresponding to an uplink HARQ process with a HARQ retransmission function off.

Optionally, the determination module 1120 is further configured to:
  determine whether to start the DRX retransmission timer corresponding to the uplink HARQ process based on the second indication information in a case that the PDCCH configured for indicating to schedule uplink initial transmission is received and that the HARQ process used for the uplink transmission corresponding to the uplink initial transmission is the HARQ process with the HARQ retransmission function off;

or, determine whether to start the DRX retransmission timer corresponding to the uplink HARQ process based on the second indication information in a case that the PDCCH configured for indicating to schedule uplink retransmission is received and that the HARQ process used for the uplink transmission corresponding to the uplink retransmission is the HARQ process with the HARQ retransmission function off.

Optionally, the determination module 1120 is further configured to:

determine whether to start the DRX retransmission timer corresponding to the uplink HARQ process based on the second indication information in a case that uplink initial transmission (data) is transmitted on an uplink grant resource and that the HARQ process used for the uplink transmission corresponding to the uplink initial transmission is the HARQ process with the HARQ retransmission function off.

Optionally, the second indication information may work on both a case that the uplink transmission is dynamic scheduling and a case that the uplink transmission is CG transmission;

or, the second indication information may only work in a case that the uplink transmission is dynamic scheduling;

or, the second indication information may only work in a case that the uplink transmission is CG transmission.

Optionally, the determination module 1120 is further configured to:

stop the DRX retransmission timer corresponding to each uplink HARQ process with the HARQ retransmission function off in a case that the second indication information is configured for indicating not to start the DRX retransmission timer corresponding to the uplink HARQ process with the HARQ retransmission function off.

Optionally, the determination module 1120 is further configured to:

start or restart the DRX retransmission timer corresponding to the uplink HARQ process when receiving the PDCCH in a case that the uplink transmission is dynamic scheduling and that the second indication information is configured for indicating to start the DRX retransmission timer corresponding to the uplink HARQ process with the HARQ retransmission function off;

or, stop the DRX retransmission timer corresponding to the uplink HARQ process when receiving the PDCCH, and start the DRX retransmission timer corresponding to the uplink HARQ process after receiving a PUSCH indicated by the PDCCH, in a case that the uplink transmission is dynamic scheduling and that the second indication information is configured for indicating to start the DRX retransmission timer corresponding to the uplink HARQ process with the HARQ retransmission function off.

Optionally, the determination module 1120 is further configured to:

start the DRX retransmission timer corresponding to the uplink HARQ process after completing the first retransmission on a PUSCH indicated by the PDCCH in a case that the uplink transmission is CG transmission scheduling and that the second indication information is configured for indicating to start the DRX retransmission timer corresponding to the uplink HARQ process with the HARQ retransmission function off.

Optionally, the indication information may be transmitted by a network device in a semi-persistent configuration mode.

Optionally, the indication information may be carried in a system message, RRC dedicated signaling, or a MAC CE.

Optionally, the first indication information may be carried in a PDCCH for activating SPS, and the second indication information may be carried in a PDCCH for activating type 2 CG.

Optionally, the indication information may be transmitted in a dynamic configuration mode.

Optionally, the indication information may be contained a PDCCH configured for indicating to schedule initial transmission or retransmission.

Optionally, the receiving module 1110 is further configured to:

receive RRC configuration information.

The RRC configuration information may include a DRX parameter and a HARQ process configuration parameter.

The DRX parameter is configured for starting a DRX timer. The DRX timer may include a DRX retransmission timer. The HARQ process configuration parameter may include the number of HARQ process(es) and the state information of the HARQ process(es). The state information of the HARQ process is configured for indicating whether a retransmission function or a feedback function of the HARQ process is enabled.

In the embodiments of the disclosure, for a HARQ process with a HARQ function off, a terminal may determine whether to start a DRX retransmission timer corresponding to a HARQ process based on indication information. Thus, the terminal may flexibly start a DRX retransmission timer corresponding to a HARQ for transmitting data. When the DRX retransmission timer is not started, an objective of saving power for the terminal may be achieved.

Figure 12:
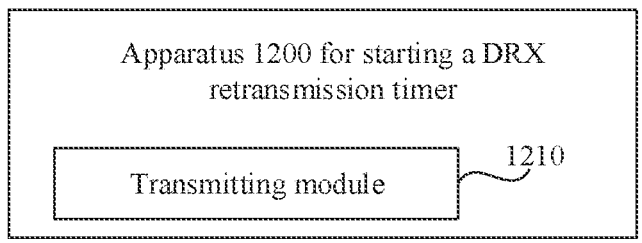
FIG. 12 is a schematic structural diagram of an apparatus for starting a DRX retransmission timer by another exemplary embodiment of the disclosure.

FIG. 12 is a schematic structural diagram of an apparatus for starting a DRX retransmission timer according to another exemplary embodiment of the disclosure. The apparatus 1200 may be arranged in a network device. The apparatus 1200 includes: a transmitting module 1210.

The transmitting module 1210 is configured to transmit indication information. The indication information is configured for indicating a terminal whether to start a DRX retransmission timer corresponding to a HARQ process.

Optionally, the indication information may be first indication information.

The first indication information is configured for indicating the terminal whether to start the DRX retransmission timer corresponding to a downlink HARQ process with a HARQ feedback function off.

Optionally, the indication information may be second indication information.

The second indication information is configured for indicating the terminal whether to start a DRX retransmission timer corresponding to an uplink HARQ process with a HARQ retransmission function off.

Optionally, the indication information may work in a case that a transmission resource is dynamic scheduling and that a transmission resource is semi-persistent scheduling (SPS). The SPS is SPS configured for indicating to schedule a downlink transmission resource or is CG configured for indicating to schedule an uplink transmission resource;

or, the indication information may only work in a case that a transmission resource is dynamic scheduling;

or, the indication information may only work in a case that a transmission resource is SPS.

Optionally, the indication information may be transmitted in a semi-persistent configuration mode.

Optionally, the indication information may be carried in a system message, RRC dedicated signaling, or a MAC CE.

Optionally, the first indication information may be carried in a PDCCH for activating SPS, and the second indication information may be carried in a PDCCH for activating type 2 CG.

Optionally, the indication information may be transmitted in a dynamic configuration mode.

Optionally, the indication information may be contained a PDCCH configured for indicating to schedule initial transmission or retransmission.

Optionally, the transmitting module 1210 is further configured to:

transmit RRC configuration information.

The RRC configuration information may include a DRX parameter and a HARQ process configuration parameter.

The DRX parameter is configured for starting a DRX timer. The DRX timer may include a DRX retransmission timer. The HARQ process configuration parameter may include the number of HARQ process(es) and the state information of the HARQ process(es). The state information of the HARQ process is configured for indicating whether a retransmission function or a feedback function of the HARQ process is enabled.

In the embodiments of the disclosure, a network device may effectively control a PDCCH listening action of a terminal by transmitting indication information. The indication information is configured for indicating the terminal whether to start a DRX retransmission timer corresponding to a HARQ process. When a network expects to schedule retransmission, the terminal may be indicated to start the DRX retransmission timer to listen to a PDCCH scheduled by the retransmission. When the network does not expect to schedule retransmission, the terminal may not start the DRX retransmission timer, so as to achieve an objective of saving power for the terminal.

Figure 13:
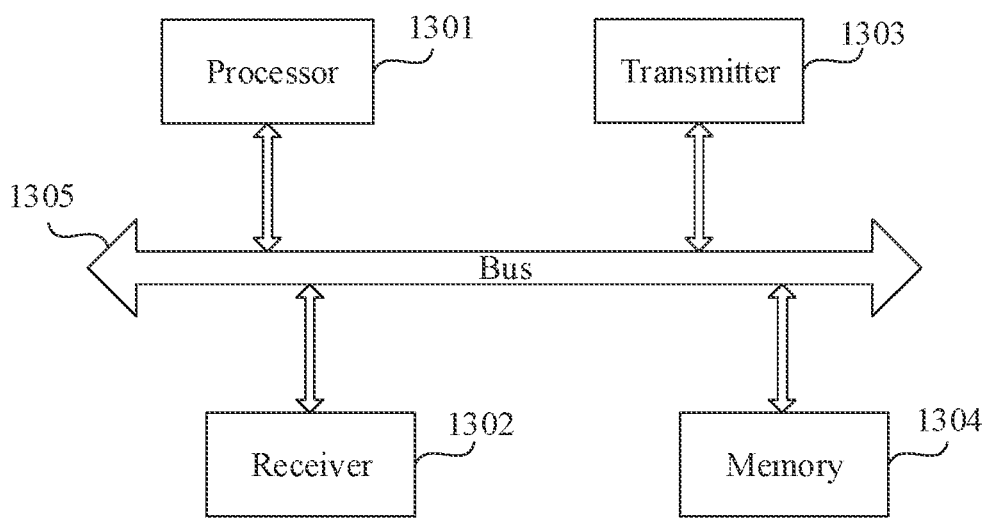
FIG. 13 is a schematic structural diagram of a communication device according to an exemplary embodiment of the disclosure.

Referring to FIG. 13, which is a communication device (a terminal or a network device) according to an exemplary embodiment of the disclosure. The communication device includes a processor 1301, a receiver 1302, a transmitter 1303, a memory 1304, and a bus 1305.

The processor 1301 includes one or more processing cores. The processor 1301 may execute various functional applications and information processing by running software programs and modules.

The receiver 1302 and the transmitter 1303 may be implemented as a communication component. The communication component may be a communication chip.

The memory 1304 may be connected to the processor 1301 through the bus 1305.

The memory 1304 may be configured to store at least one instruction. The processor 1301 is configured to execute the at least one instruction to implement various steps performed by the terminal and the network device in various method embodiments.

In addition, the memory 1304 may be implemented by any type of volatile or non-volatile memory devices, or a combination thereof. The volatile or non-volatile memory devices include, but are not limited to, a magnetic disk or a compact disk, an Electrically Erasable Programmable Read Only Memory (EEPROM), an Electrical Programmable Read-Only Memory (EPROM), a Static Random Access Memory (SRAM), a Read Only Memory (ROM), a magnetic memory, a flash memory, and a Programmable Read-Only Memory (PROM).

The disclosure provides a computer-readable storage medium. The storage medium stores at least one instruction. The at least one instruction may be loaded and executed by a processor to implement the method for starting a DRX retransmission timer according to various method embodiments mentioned above.

The disclosure further provides a computer program product. When the computer program product runs on a computer, the computer may implement the method for starting a DRX retransmission timer according to various method embodiments mentioned above.

A person skilled in the art should be aware that in the foregoing one or more examples, the functions described in the embodiments of this disclosure may be implemented by hardware, software, firmware, or any combination thereof. When software is used for implementation, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible by a general-purpose or dedicated computer.

The above descriptions are merely optional embodiments of the disclosure, but are not intended to limit the disclosure. Any modification, equivalent replacement, or improvement made without departing from the spirit and principle of the disclosure shall fall within the scope of the protection of the disclosure.

The invention claimed is:

1. A method for starting a discontinuous reception (DRX) retransmission timer, implemented by a terminal, the method comprising:

receiving indication information; and determining whether to start a DRX retransmission timer corresponding to a hybrid automatic repeat request (HARQ) process based on the indication information, wherein the method further comprises:

before receiving the indication information, receiving RRC configuration information, the RRC configuration information comprising a DRX parameter and a HARQ process configuration parameter, wherein the DRX parameter is configured for starting a DRX timer; the DRX timer comprises the DRX retransmission timer; the HARQ process configuration parameter comprises a number of HARQ process(es) and state information of the HARQ process(es); and the state information of the HARQ process is configured for indicating whether a retransmission function or a feedback function of the HARQ process is enabled.

2. The method of claim 1, wherein the indication information is first indication information; and the first indication information is configured for indicating the terminal whether to start the DRX retransmission timer for a downlink HARQ process with a HARQ feedback function off.

3. The method of claim 2, wherein determining whether to start the DRX retransmission timer corresponding to the HARQ process based on the indication information comprises:
determining whether to start the DRX retransmission timer corresponding to the downlink HARQ process based on the first indication information in a case that a physical downlink control channel (PDCCH) configured for indicating to schedule downlink initial transmission is received and the HARQ process used for downlink transmission corresponding to the downlink initial transmission is the HARQ process with the HARQ feedback function off;
or,
determining whether to start the DRX retransmission timer corresponding to the downlink HARQ process based on the first indication information in a case that a PDCCH configured for indicating to schedule downlink retransmission is received and the HARQ process used for downlink transmission corresponding to the downlink retransmission is the HARQ process with the HARQ feedback function off;
or,
determining whether to start the DRX retransmission timer corresponding to the downlink HARQ process based on the first indication information in a case that downlink initial transmission (data) is received on a downlink grant resource and the HARQ process used for downlink transmission corresponding to the downlink initial transmission is the HARQ process with the HARQ feedback function off.

4. The method of claim 3, wherein
the first indication information works in both a case that the downlink transmission is dynamic scheduling and a case that the downlink transmission is semi-persistent scheduling (SPS) transmission;
or,
the first indication information only works in a case that the downlink transmission is dynamic scheduling;
or,
the first indication information only works in a case that the downlink transmission is SPS transmission.

5. The method of claim 3, wherein determining whether to start the DRX retransmission timer corresponding to the downlink HARQ process based on the first indication information comprises:
stopping the DRX retransmission timer corresponding to each downlink HARQ process with the HARQ feedback function off in a case that the first indication information is configured for indicating not to start the DRX retransmission timer corresponding to the downlink HARQ process with the HARQ feedback function off;
or,
starting or restarting the DRX retransmission timer corresponding to the downlink HARQ process when receiving the PDCCH in a case that the downlink transmission is dynamic scheduling and that the first indication information is configured for indicating to start the DRX retransmission timer corresponding to the downlink HARQ process with the HARQ feedback function off;
or,
stopping the DRX retransmission timer corresponding to the downlink HARQ process when receiving the PDCCH, and starting the DRX retransmission timer corresponding to the downlink HARQ process after receiving a Physical Downlink Shared Channel (PDSCH) indicated by the PDCCH, in a case that the downlink transmission is dynamic scheduling and that the first indication information is configured for indicating to start the DRX retransmission timer corresponding to the downlink HARQ process with the HARQ feedback function off;
or,
starting the DRX retransmission timer corresponding to the downlink HARQ process after receiving a PDSCH indicated by the PDCCH in a case that the downlink transmission is SPS transmission scheduling and that the first indication information is configured for indicating to start the DRX retransmission timer corresponding to the downlink HARQ process with the HARQ feedback function off.

6. The method of claim 2, wherein the indication information is transmitted by a network device in a semi-persistent configuration mode.

7. The method of claim 6, wherein the indication information is carried in a system message, radio resource control (RRC) dedicated signaling, or a medium access control control element (MAC CE).

8. The method of claim 6, wherein the first indication information is carried in a PDCCH for activating SPS.

9. The method of claim 2, wherein the indication information is transmitted in a dynamic configuration mode.

10. The method of claim 9, wherein the indication information is contained in a PDCCH configured for scheduling initial transmission or retransmission.

11. An apparatus for starting a discontinuous reception (DRX) retransmission timer, comprising:
a receiver, configured to receive indication information; and
a processor, connected to the receiver and configured to determine whether to start a DRX retransmission timer corresponding to a hybrid automatic repeat request (HARQ) process based on the indication information,
wherein the receiver is further configured to:
before receiving the indication information, receive RRC configuration information, the RRC configuration information comprising a DRX parameter and a HARQ process configuration parameter,
wherein the DRX parameter is configured for starting a DRX timer; the DRX timer comprises the DRX retransmission timer; the HARQ process configuration parameter comprises a number of HARQ process(es) and state information of the HARQ process(es); and the state information of the HARQ process is configured for indicating whether a retransmission function or a feedback function of the HARQ process is enabled.

12. The apparatus of claim 11, wherein the indication information is second indication information; and
the second indication information is configured for indicating the terminal whether to start a DRX retransmission timer for an uplink HARQ process with a HARQ retransmission function off.

13. The apparatus of claim 12, wherein the processor is further configured to:
determine whether to start the DRX retransmission timer corresponding to the uplink HARQ process based on the second indication information in a case that a PDCCH configured for indicating to schedule uplink initial transmission is received and that the HARQ process used for uplink transmission corresponding to the uplink initial transmission is the HARQ process with the HARQ retransmission function off;

or, determine whether to start the DRX retransmission timer corresponding to the uplink HARQ process based on the second indication information in a case that a PDCCH configured for indicating to schedule uplink retransmission is received and that the HARQ process used for uplink transmission corresponding to the uplink retransmission is the HARQ process with the HARQ retransmission function off; or determine whether to start the DRX retransmission timer corresponding to the uplink HARQ process based on the second indication information in a case that uplink initial transmission (data) is transmitted on an uplink grant resource and that the HARQ process used for uplink transmission corresponding to the uplink initial transmission is the HARQ process with the HARQ retransmission function off.

14. The apparatus of claim 13, wherein the second indication information works in both a case that the uplink transmission is dynamic scheduling and a case that the uplink transmission is configured grant (CG) transmission;

or, the second indication information only works in a case that the downlink transmission is dynamic scheduling;

or, the second indication information only works in a case that the uplink transmission is CG transmission.

15. The apparatus of claim 13, wherein the processor is further configured to:

stop the DRX retransmission timer corresponding to each uplink HARQ process with the HARQ retransmission function off in a case that the second indication information is configured for indicating not to start the DRX retransmission timer corresponding to the uplink HARQ process with the HARQ retransmission function off;

or, start or restart the DRX retransmission timer corresponding to the uplink HARQ process when receiving the PDCCH in a case that the uplink transmission is dynamic scheduling and that the second indication information is configured for indicating to start the DRX retransmission timer corresponding to the uplink HARQ process with the HARQ retransmission function off;

or, stop the DRX retransmission timer corresponding to the uplink HARQ process when receiving the PDCCH, and starting the DRX retransmission timer corresponding to the uplink HARQ process after receiving a Physical Uplink Shared Channel (PUSCH) indicated by the PDCCH, in a case that the uplink transmission is dynamic scheduling and that the second indication information is configured for indicating to start the DRX retransmission timer corresponding to the uplink HARQ process with the HARQ retransmission function off;

or, start the DRX retransmission timer corresponding to the uplink HARQ process after completing first retransmission on a PUSCH indicated by the PDCCH in a case that the uplink transmission is CG transmission scheduling and that the second indication information is configured for indicating to start the DRX retransmission timer corresponding to the uplink HARQ process with the HARQ retransmission function off.

16. The apparatus of claim 12, wherein the indication information is transmitted by a network device in a semi-persistent configuration mode.

17. The apparatus of claim 16, wherein the second indication information is carried in a PDCCH for activating type 2 CG.

18. The apparatus of claim 12, wherein the indication information is transmitted in a dynamic configuration mode, and is contained in a PDCCH configured for scheduling initial transmission or retransmission.

19. An apparatus for starting a discontinuous reception (DRX) retransmission timer, comprising:

a processor; and a transmitter, connected to the processor and configured to transmit indication information, wherein the indication information is configured for indicating the terminal whether to start a DRX retransmission timer corresponding to a hybrid automatic repeat request (HARQ) process, wherein the transmitter is further configured to:

before transmitting the indication information, transmit RRC configuration information, the RRC configuration information comprising a DRX parameter and a HARQ process configuration parameter, wherein the DRX parameter is configured for starting a DRX timer; the DRX timer comprises the DRX retransmission timer; the HARQ process configuration parameter comprises a number of HARQ process(es) and state information of the HARQ process(es); and the state information of the HARQ process is configured for indicating whether a retransmission function or a feedback function of the HARQ process is enabled.

* * * * *